(12) United States Patent
Kiehl et al.

(10) Patent No.: US 7,019,554 B2
(45) Date of Patent: Mar. 28, 2006

(54) METHODS AND APPARATUS FOR ACTIVE TERMINATION OF HIGH-FREQUENCY SIGNALS

(75) Inventors: Oliver Kiehl, Charlotte, VT (US); Hans-Heinrich Viehmann, South Burlington, VT (US)

(73) Assignee: Infineon Technologies AG, Munich (DE)

( * ) Notice: Subject to any disclaimer, the term of this patent is extended or adjusted under 35 U.S.C. 154(b) by 145 days.

(21) Appl. No.: 10/727,106

(22) Filed: Dec. 3, 2003

(65) Prior Publication Data

US 2005/0122130 A1    Jun. 9, 2005

(51) Int. Cl.
*H03K 19/003* (2006.01)

(52) U.S. Cl. .......................................... 326/30; 326/33

(58) Field of Classification Search .................. 326/30, 326/26–27, 31–34
See application file for complete search history.

(56) References Cited

U.S. PATENT DOCUMENTS

| | | | | |
|---|---|---|---|---|
| 5,955,911 A | * | 9/1999 | Drost et al. | 327/404 |
| 6,072,331 A | * | 6/2000 | Takizawa | 326/30 |
| 6,388,495 B1 | * | 5/2002 | Roy et al. | 327/309 |
| 6,836,144 B1 | * | 12/2004 | Bui et al. | 326/32 |

OTHER PUBLICATIONS

P.R. Gray, et al., "Analysis and Design of Analog Integrated Circuits" ISBN 0-471-87493-0, 1984 Second Edition, pp. 59-67, John Wiley & Sons, Inc., New York, no month.

* cited by examiner

*Primary Examiner*—James H. Cho
(74) *Attorney, Agent, or Firm*—Slater & Matsil, L.L.P.

(57) ABSTRACT

An integrated circuit includes at least one main circuit 313 operable to perform one or more functions. At least one termination node DQ receives or transmits an operating signal. An active termination circuit 301 has first and second transistors of opposite type coupled in series between a Vdd node of a first source potential and a Vss node of a second source potential. The at least one termination node is coupled to a common node between the first and second transistors. A control circuit operates to bias the first and second transistors such that they exhibit a controlled impedance at the common node. Alternatively, the control circuit operates to bias the first and second transistors such that they provide a clamping function at the common node.

24 Claims, 6 Drawing Sheets

METHODS AND APPARATUS FOR ACTIVE TERMINATION OF HIGH-FREQUENCY SIGNALS

TECHNICAL FIELD

The present invention relates to methods and apparatus for providing a termination function that exhibits a controlled impedance to terminate a signal, such as may be used in an integrated circuit or the like. In addition, the methods and apparatus may provide a clamping function to limit the voltage of the signal.

BACKGROUND

Proper termination of high-frequency signals are of particular concern in the design and implementation of electronic circuits, such as digital computers, microprocessors, digital signal processors, memory circuits, or virtually any other electronic circuit in which impedance matching of a receiving or transmitting circuit coupled to a transmission line is important. Indeed, if the impedance of a receiving or transmitting circuit is not properly controlled, then undesired transmission line effects may result, such as undesirable signal reflections. Signal reflections are of particular concern in high-frequency applications when the transmission line delay becomes comparable to, or exceeds, the waveform transition times of the transmitted signals. This obtains particularly in high speed digital circuits, where signal reflections may result in unwanted interference with an incident or received signal that in turn results in an erroneous logic level.

Transmission lines are described generally by a characteristic impedance, frequently in the range of 30 to 120 ohms. The characteristic impedance typically depends on the geometric properties of the line, the dielectric permittivity, and the magnetic permeability of the insulating material, and by a signal transmission delay proportional to line length. The characteristic impedance is the ratio of voltage to current of transmitted waveforms that propagate down the line. When the line is terminated in a resistance reasonably close to its characteristic impedance, no substantial waveform reflection occurs. When there is a substantial impedance mismatch, voltage overshoots associated with waveform reflection are generally produced that provide a disadvantageous mechanism for corruption of logic signals.

Figure 1:
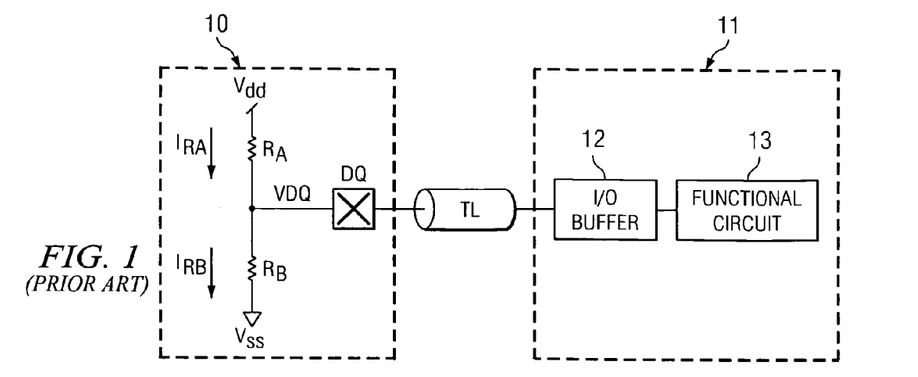
FIG. 1 illustrates a circuit diagram of a conventional resistor termination circuit coupled by a transmission line to a main circuit.

A prior art technique of providing termination of a transmission line with a desirable impedance is illustrated in FIG. 1. In particular, FIG. 1 illustrates a termination circuit 10 providing a termination node DQ, including a resistor divider comprising a first resistor $R_A$ and a second resistor $R_B$ coupled in series across voltage sources Vdd and Vss. The termination circuit is coupled to a main circuit 11 that is operable to perform one or more functions such as performed by microprocessors, digital signal processors, memory circuits, or other general signal processing devices. For illustrative purposes, the main circuit 11 might include an I/O buffer 12 that performs a signal isolation or conditioning function, coupled to a functional circuit 13. The termination circuit 10 is coupled to the main circuit 11 by a transmission line TL, recognizing the physical separation between these two circuits. The transmission line TL is described by a characteristic impedance and a transmission delay.

With the configuration shown for the termination circuit 10, the impedance at the termination node DQ is approximately equal to the parallel combination of resistors $R_A$ and $R_B$. The values of $R_A$ and $R_B$ are selected to achieve a line termination impedance substantially equal to the transmission line characteristic impedance, thereby reducing or eliminating unwanted signal reflections. Among the disadvantages of this prior art resistor-termination approach are relatively high cross currents through the resistors $R_A$ and $R_B$ as a consequence of the dc voltage difference between the nodes Vdd and Vss, and attendant power dissipation.

Figure 2:
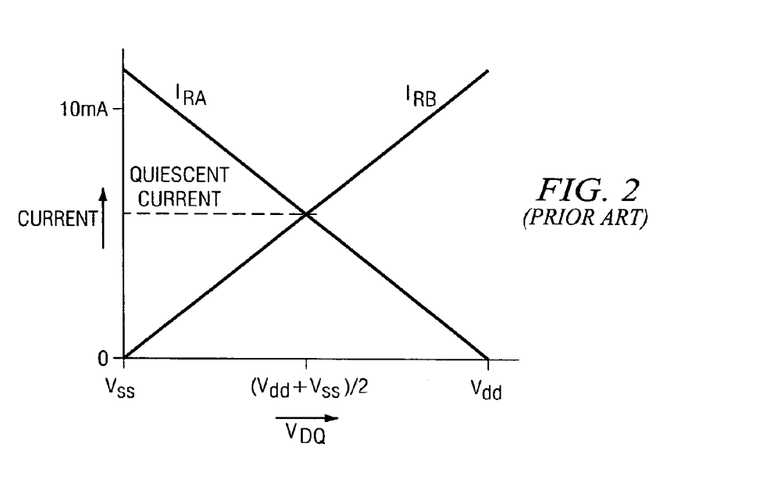
FIG. 2 is a graph illustrating the voltage and current characteristics of circuit components of FIG. 1.

Power consumption and dissipation characteristics of the resistor-termination approach will be discussed with reference to FIG. 2. FIG. 2 illustrates the current and voltage characteristics of the respective resistors $R_A$ and $R_B$. The voltage $V_{DQ}$ along the abscissa of the illustrated graph represents a voltage induced on the termination node DQ of the termination circuit 10 of FIG. 1. The induced voltage may be produced by the I/O buffer 12 on FIG. 1 or a driver circuit (e.g., from another integrated circuit) that operates to produce a logic high level or a logic low level. For example, the driver circuit might output a logic high level by placing a voltage approaching Vdd on the termination node DQ. Alternatively, the driver circuit might operate to produce a logic low level by placing a voltage approaching Vss on the termination node DQ.

The voltage placed on the termination node DQ by the driver circuit affects the current in the resistors $R_A$ and $R_B$. Assuming that $R_A$ and $R_B$ are substantially equal to one another, then the currents $I_{RA}$ and $I_{RB}$ through $R_A$ and $R_B$, respectively, intersect one another at a termination node DQ voltage of about $$\frac{Vdd + Vss}{2},$$

which represents the quiescent current in the resistors $R_A$ and $R_B$, i.e., when no current flows into the termination node DQ. If the resistors $R_A$ and $R_B$ are each equal to twice the characteristic impedance of the coupled transmission line, then the impedance of the termination node DQ will be equal to the parallel combination of the resistance of $R_A$ and $R_B$, which is desirably the transmission line characteristic impedance. The resulting quiescent current through resistors $R_A$ and $R_B$ when no current flows into the termination node DQ will be one quarter the potential difference between the voltage sources Vdd and Vss divided by the transmission line characteristic impedance. In practice to maintain sufficient signal integrity, it is generally not required to match precisely the transmission line characteristic impedance with a termination impedance. Often the termination impedance is set somewhat higher than the line characteristic impedance to reduce power dissipation in the termination circuit.

As the voltage $V_{DQ}$ at the termination node DQ is reduced by the driver circuit, the current $I_{RA}$ through resistor $R_A$ increases (due to an increase in the voltage thereacross) and the current $I_{RB}$ through resistor $R_B$ decreases (due to a reduction in the voltage thereacross). Depending on the specific values of Vdd, Vss, $R_A$, and $R_B$, the magnitude of the currents $I_{RA}$ and $I_{RB}$ may be several mA (e.g., about 5–10 mA) for an exemplary potential difference between Vdd and Vss of 1.8 volts and a transmission line characteristic impedance of 75 ohms. This is a relatively high value, and represents substantial power dissipation for a small, integrated signaling circuit with many I/O lines, particularly when the signal transmission function may be idle for a substantial fraction of the time. The circuit in FIG. 1 does not provide the capability to selectively disable or decouple the termination function when it is known that no signal is being transmitted. By this means the power associated with quiescent current flow in the termination resistors would be saved entirely.

Other prior art techniques provide a clamp termination circuit that limits the voltage excursion of the termination node DQ not to be substantially greater than the voltage source Vdd and not substantially less than the voltage source Vss. While often providing protection for the receiving logic coupled to the termination node DQ, significant voltage waveform reflections in the transmission line are generally created by the non-linear characteristics of the clamp circuit, transferring the transmission line termination problem to its opposite end.

Accordingly, there are needs in the art for new methods and apparatus for terminating a signal that do not draw excessive current from a power supply, yet provide a controlled impedance in order to reduce or eliminate signal reflections, or a clamping function to limit voltage overshoots.

SUMMARY OF THE INVENTION

In accordance with one or more aspects of the present invention, an integrated circuit may include at least one main circuit operable to perform one or more functions. The integrated circuit includes at least one termination node for receiving or transmitting an operating signal. An active termination circuit has first and second transistors of opposite type coupled in series across a Vdd node of a first source potential and a Vss node of a second source potential, which is lower than the first source potential. The at least one termination node is coupled to a common node between the first and second transistors. A control circuit operates to bias the first and second transistors such that they achieve a controlled impedance at the common node.

In one embodiment, the control circuit is operable to bias the first and second transistors such that they provide a clamping function at the common node. In another embodiment, the first and second transistors may be first and second MOSFETs, wherein the first MOSFET may be of the N-channel type and the second MOSFET of the P-channel type. The drain of the first MOSFET is coupled to the Vdd node, and the drain of the second MOSFET is coupled to the Vss node. The sources of both MOSFETs are coupled together and to the common node. In yet another embodiment, the first and second transistors are bipolar transistors.

The control circuit preferably includes a first control terminal circuit operable to provide a first control terminal drive signal to a control terminal of the first transistor, and a second control terminal circuit operable to provide a second control terminal drive signal to a control terminal of the second transistor. The control terminal of a MOSFET is its gate terminal. The control terminal of a bipolar transistor is its base terminal. The first and second control terminal drive signals are preferably produced such that a quiescent voltage potential of the common node is between the Vdd and Vss potentials. The quiescent voltage potential of the common node may be at about a midpoint between the Vdd and Vss potentials. The quiescent voltage potential of the common node is preferably substantially non-zero. The termination circuit is in a quiescent condition when no substantial current flows into the termination node DQ.

The first and second control terminal circuits are preferably operable to provide a first control terminal drive signal to the control terminal of the first transistor and a second control terminal drive signal to the control terminal of the second transistor to control the quiescent current in a current path through the first and second transistors. The current path through a MOSFET includes the source and drain. The current path through a bipolar transistor includes the emitter and collector.

The first control terminal drive signal to a control terminal of the first transistor and the second control terminal drive signal to a control terminal of the second transistor are preferably controlled such that the quiescent current in a current path through the first and second transistors is significantly less than the current through two resistors whose parallel resistance approximates the characteristic impedance of the coupled transmission line.

The device geometries, device size, and processing of the first and second transistors are preferably scaled so that their coupled common node achieves the controlled impedance and the quiescent voltage potential in response to induced voltages produced by the driver circuit coupling communication signals to the termination node.

In accordance with one or more further aspects of the present invention, the first and second gate control circuits may operate from voltage sources that are greater than the source potential Vdd for the first gate control circuit, and less than the source potential Vss for the second gate control circuit, and are capable of providing gate control signals, respectively, that are greater than the source potential Vdd and less than the source potential Vss.

In accordance with one or more further aspects of the present invention, a third transistor may be series coupled between the first transistor and the voltage source Vdd and a fourth transistor may be series coupled between the second transistor and the voltage source Vss so that the operation of the first and second transistors can be selectively enabled or disabled by control signals coupled to the respective control terminals of the third and fourth transistors.

In accordance with one or more further aspects of the present invention, the third transistor is a P-channel MOSFET and fourth transistor is an N-channel MOSFET.

In accordance with one or more further aspects of the present invention, a control terminal control circuit preferably includes a fifth and a sixth transistor in series across the Vdd node of a first source potential and a Vss node of a second source potential and scaled to the first and second transistors, and a current source coupled to the at least one of the fifth or sixth transistor that controls the quiescent current level in the first and second transistors.

In accordance with one or more further aspects of the present invention, the fifth transistor is an N-channel MOSFET and the sixth transistor is a P-channel MOSFET.

In accordance with one or more further aspects of the present invention, the control circuit preferably includes a voltage source operable to produce a voltage potential of about one half of the potential difference between the voltage sources Vdd and Vss.

In accordance with one or more further aspects of the present invention, the control circuit preferably includes a voltage source operable to produce a voltage potential responsive to an externally supplied input voltage.

In accordance with one or more further aspects of the present invention, a resistor optionally may be inserted between the common node and the termination node.

In accordance with one or more further aspects of the present invention, an active termination circuit includes: a first MOSFET having a gate terminal, a drain terminal, and a source terminal, the source terminal being coupled to a common node, and the drain terminal being coupled to a Vdd node of a first source potential; a second MOSFET having a gate terminal, a drain terminal, and a source terminal, the drain terminal being coupled to a Vss node of a second source potential, and the source terminal being coupled to the common node; and a control circuit operable to bias the first and second MOSFETs such that they exhibit a controlled impedance at the common node.

In accordance with one or more further aspects of the present invention, an active termination circuit includes: a first bipolar transistor having a base terminal, a collector terminal, and a emitter terminal, the emitter terminal being coupled to a common node, and the collector terminal being coupled to a Vdd node of a first source potential; a second MOSFET having a base terminal, a collector terminal, and a emitter terminal, the collector terminal being coupled to a Vss node of a second source potential, and the emitter terminal being coupled to the common node; and a control circuit operable to bias the first and second bipolar transistors such that they exhibit a controlled impedance at the common node.

In accordance with one or more further aspects of the present invention, the first MOSFET is an N-channel MOSFET and the second MOSFET is a P-channel MOSFET.

In accordance with one or more further aspects of the present invention, the first bipolar transistor is an N-type transistor and the second bipolar transistor is a P-type transistor.

In accordance with one or more further aspects of the present invention, a method includes biasing first and second series coupled transistors of opposite type, coupled in a follower configuration such that they exhibit a controlled impedance at a common node thereof, wherein the first and second transistors are coupled in series across a Vdd node of a first source potential and a Vss node of a second source potential, the common node being at a junction between the first and second transistors.

In accordance with one or more further aspects of the present invention, a method includes biasing first and second series coupled transistors such that a quiescent voltage potential of the common node is between the Vdd and Vss potentials.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 3:
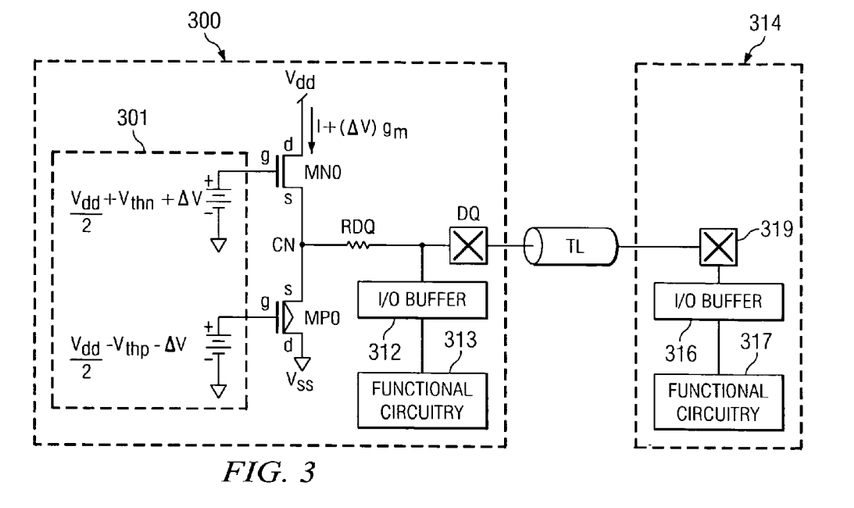
FIG. 3 is a circuit diagram of an active termination circuit in accordance with one or more aspects of the present invention.

Referring now to the drawings, wherein like numerals and designations indicate like elements, FIG. 3 shows an active termination circuit 300 in accordance with one or more aspects of the present invention. The circuit in FIG. 3 includes N- and P-channel MOSFETs as transistors, but, alternatively, npn and pnp bipolar transistors can be substituted in the design with appropriate circuit modifications, as is well understood in the art. The active termination circuit 300 is coupled to a transmission line TL which connects to other circuits separate from the active termination circuit 300 such as the circuit block represented by the circuit block 314. The circuit block 314 representing other circuits may include a bond pad 319, an I/O buffer 316, and functional circuitry 317. In the preferred embodiment, the termination circuit 300 includes an external node (e.g., a bond pad), labeled DQ in this example. The resistor $R_{DQ}$ shown on FIG. 3 is optional. When resistor $R_{DQ}$ is omitted, node CN is coupled directly to node DQ, and in this case no distinction is made between the two nodes. FIG. 3 also illustrates I/O buffer 312 and functional circuitry 313, which may be collocated with the active termination circuit 300 and may be included on the same die with active termination circuit 300. For example, in a DRAM chip the functional circuitry 313 includes the memory array and peripheral circuitry. The functional circuitry 313 could also be a controller, a processor (e.g., microprocessor or digital signal processor), or other memory device, as just some examples. In another embodiment the I/O buffer is connected to node CN (with RDQ present). In general, any integrated circuit chip that is attached to an external line can benefit from the concepts of the present invention.

The active termination circuit 300 includes a first, N-channel MOSFET MN0 and a second, P-channel MOSFET MP0. Each MOSFET MN0 and MP0 includes a gate terminal g, a drain terminal d, and a source terminal s. The source terminal s of the N-channel MOSFET MN0 is coupled to a common node CN, which in turn is coupled to a termination node DQ through the optional resistor $R_{DQ}$. The drain terminal d of the first, N-channel MOSFET MN0 is coupled to a Vdd node of a first source potential. By way of example, the Vdd node may provide 1.8 volts, 2.5 volts, 3.3 volts, or other reference voltage. The source terminal s of the second, P-channel MOSFET MP0 is also coupled to the common node CN through the optional resistor $R_{DQ}$.

The drain terminal d of the second, P-channel MOSFET is coupled to a Vss node of a second source potential, such as ground. The respective gate terminals g of the first and second MOSFETs MN0 and MP0 are coupled to their respective gate drive signals, Vngate and Vpgate, from a control circuit 301. This rudimentary control circuit operates to bias the first and second MOSFETs MN0 and MP0 such that they exhibit a controlled impedance at the common node CN. Alternatively, control circuit operates to bias the first and second MOSFETs MN0 and MP0 such that they provide a clamping function at the common node CN.

A small current I on the order of 0.5 mA is arranged to flow through the two series-coupled MOSFETs MN0 and MP0, assuming initially that no current flows into the termination node DQ, representing a quiescent operating condition. If the source of MOSFET MN0 is required to be, for example, at a midpoint voltage such as Vdd/2 when the source voltage Vss is at ground, in the absence of current into the termination node DQ, then to conduct the drain current I, its gate must be held at a small FET—dependent voltage slightly greater than Vdd2 plus the FET threshold voltage. This required gate voltage can be represented by the expression Vdd/2+Vthn, where Vthn is the gate-to-source voltage for the FET MN0 corresponding to the drain current I. The gate of the N-channel MOSFET MN0 is coupled to a voltage Vdd/2+Vthn from the control circuit 301 to provide this required gate voltage so as to conduct the current I with its source at voltage Vdd/2.

We assume for the moment that the term ΔV representing a voltage increment on FIG. 3 is zero. Similarly, since the source of P-channel MOSFET MP0 is also coupled to the node DQ, it must be at the voltage Vdd/2, and its gate must be held at a FET-dependent voltage below Vdd/2 corresponding to the current I, represented by the expression Vdd/2−Vthp. The gate of the P-channel MOSFET MP0 is coupled to a second voltage Vdd/2−Vthp from the control circuit 301 to provide this required voltage so as to conduct the current I with its source at voltage Vdd/2. Thus, the series-coupled circuit of the two MOSFETs is arranged to controllably conduct a small current I, and the termination node DQ is controllably held at the voltage Vdd/2 in the absence of current flowing into the termination node DQ.

Consider next the effect of increasing the voltage coupled to the gate of MOSFET MN0 by an increment, ΔV volts, as represented by the term ΔV on FIG. 3, and decreasing the voltage coupled to the gate of MOSFET MP0 by a corresponding decrement, ΔV volts. The voltage decrement ΔV increases the gate drive of MOSFET MP0, increasing the drain current in the P-channel MOSFET. The voltage increment ΔV increases the gate drive of MOSFET MN0, increasing the drain current in the N-channel MOSFET. To simplify the discussion, the MOSFETs MN0 and MP0 are assumed without limitation to have equal transconductance, $g_m$. In practice, especially with devices produced with geometries in the sub-micron region, the transconductance of devices of opposite type would not be expected to be equal. The result is the current I in both MOSFETs is increased by ΔV times the transconductance $g_m$ of the MOSFETs, and by the symmetry of the changes to both gate drive voltages, no change to the voltage coupled to the termination node DQ results under quiescent operating conditions. It thus can be seen that there are two degrees of freedom in selecting the gate voltages for the MOSFETs MN0 and MP0 that permit independent adjustment of the open-circuit voltage of the node DQ and of the quiescent drain current I in the MOSFETs. Alternatively, it can be seen that there are two degrees of freedom providing independent adjustment of the open-circuit voltage of the node DQ and its impedance.

Figure 4:
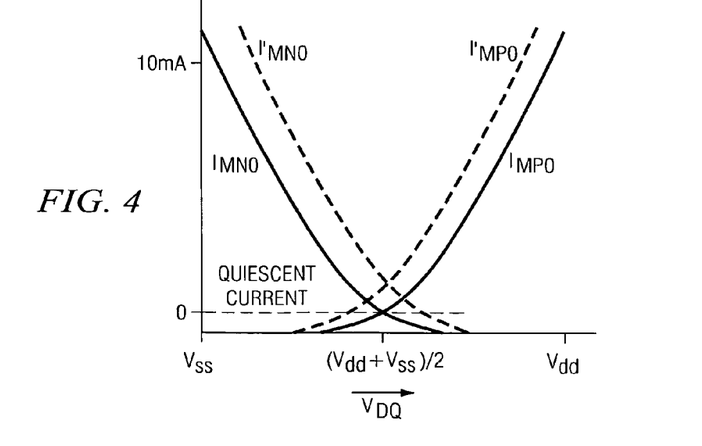
FIG. 4 is a graph illustrating the voltage and current characteristics of components of the circuit of FIG. 3.

FIG. 4 illustrates with solid curved lines the current $I_{MN0}$ and $I_{MP0}$ flowing in each MOSFET as a function of the voltage $V_{DQ}$ at the termination node DQ, with fixed gate voltages Vngate and Vpgate. The shape of these curves reflects the typically quadratic dependence of MOSFET drain current on gate-to-source voltage above the MOSFET threshold voltage. If an external logic driver circuit raises the voltage of the termination node DQ, say by a few hundred millivolts, the current in the N-channel MOSFET MN0 substantially turns off. Similarly, if an external circuit lowers the voltage of the node DQ, say by a few hundred millivolts, the current in the P-channel MOSFET MP0 substantially turns off. The impedance presented to the node DQ by the two MOSFETs is controlled by the N-channel MOSFET if the DQ node voltage is substantially lowered, and by the P-channel MOSFET if the DQ node voltage is substantially increased.

For small changes in the DQ node voltage, the impedance is controlled by both MOSFETs. For a voltage increment ΔV on FIG. 3, the current in each MOSFET is raised as represented by the dashed lines on FIG. 4, resulting in a higher quiescent current and a lower controlled impedance presented to the common node CN. The impedance presented by either MOSFET MN0 or MP0 is the reciprocal of its transconductance; MOSFET transconductance varies roughly as the square root of its drain current, and drain current varies as the square of MOSFET gate-to-source voltage above its gate-to-source threshold voltage. Thus a MOSFET's source impedance varies roughly inversely as the gate-to-source voltage above its gate-to-source threshold voltage.

By choosing a current I and a voltage increment ΔV, and by designing the MOSFET geometries and other silicon characteristics, both the output impedance of the termination circuit presented to the termination node DQ and the termination node DQ open-circuit voltage can be controlled. The gate voltage increment need only be applied to one of the N-channel or P-channel MOSFETs, MN0 or MP0, to alter the controlled impedance, and the reference voltage represented by Vdd/2 can be correspondingly adjusted to correct any resulting open-circuit voltage error caused by the increment ΔV. The reference voltage can be derived either from the potential difference between Vdd and Vss, or from Vdd alone, or can be supplied from an external source.

The effect of MOSFET device area, the geometry of internal silicon structures, and silicon processing on device characteristics such as transconductance is well known in the art, as discussed in Gray, P. R. and Meyer, R. G., Analysis and Design of Analog Integrated Circuits, ISBN 0-471-87493-0, 1984, Second Edition, particularly but not limited to pages 59–67, which is incorporated herein by reference.

Figure 5:
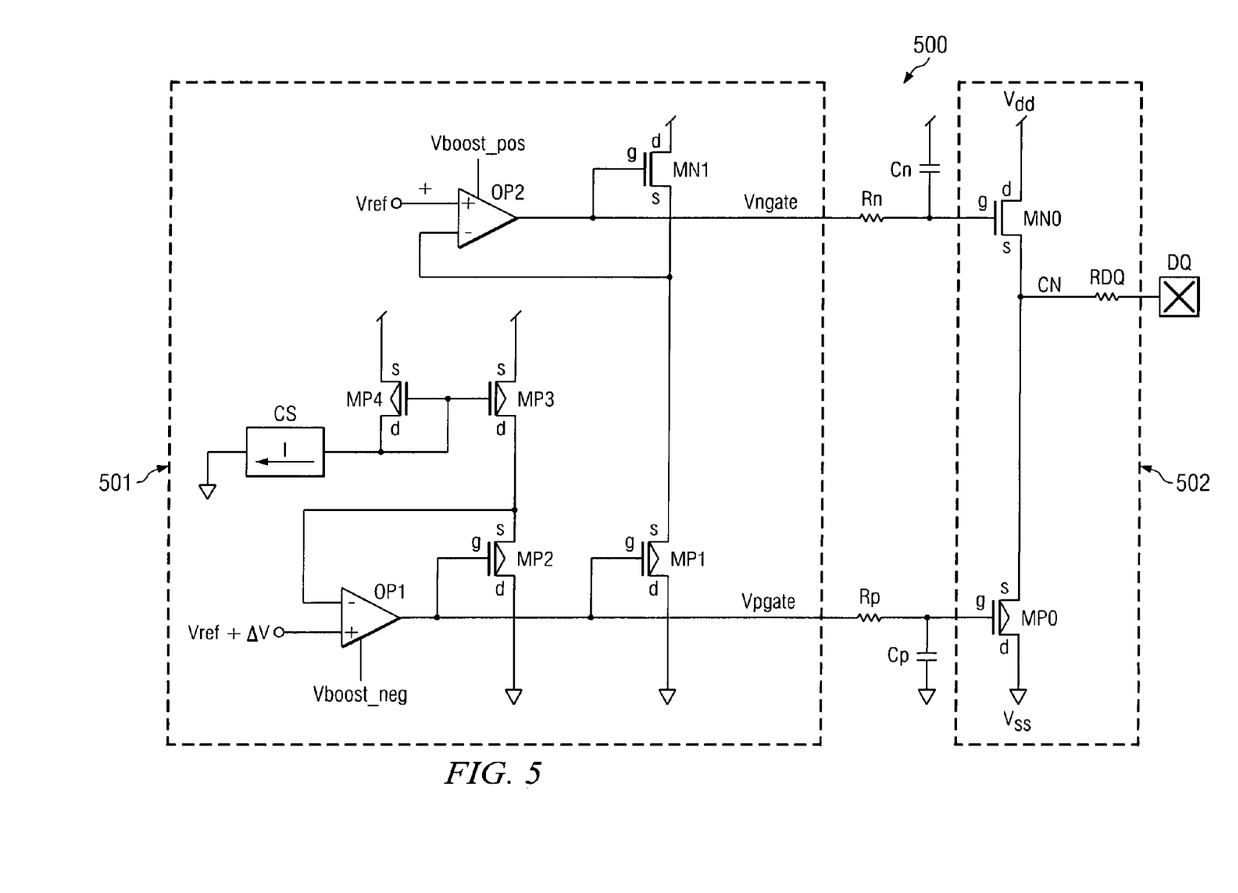
FIG. 5 is a circuit diagram of an active termination circuit in accordance with one or more aspects of the present invention.

Reference is now made to FIG. 5, which is a circuit diagram of an active termination circuit 500 in accordance with one or more further aspects of the present invention. The active termination circuit 500 includes an active series circuit 502 coupled to a control circuit 501. The active series circuit 502 includes first and second N- and P-channel MOSFETs MN0 and MP0 as in the circuit 300 of FIG. 3. The circuit in FIG. 5 includes N- and P-channel MOSFETs as transistors, but, alternatively, npn and pnp bipolar transistors can be substituted in the design with appropriate circuit modifications to other portions of the circuit, as is well understood in the art. The control circuit 501 is preferably operable to bias the MOSFETs MN0 and MP0 such that a desired quiescent voltage obtains at the termination node DQ, and a desired small quiescent current is conducted through the MOSFETs MN0 and MP0.

Alternatively, a controlled impedance is presented to the termination node DQ. Each MOSFET MN0 and MP0 includes a gate terminal g, a drain terminal d, and a source terminal s. The source terminal s of the first, N-channel MOSFET MN0 is coupled to the common node CN, which is coupled to the termination node DQ of the active termination circuit 500, through the optional resistor RDQ. The drain terminal d of the first, N-channel MOSFET MN0 is coupled to a Vdd node of a first source potential. The drain terminal d of the second, P-channel MOSFET MP0 is coupled to a Vss node of a second source potential, such as ground. The source terminal s of the second, P-channel MOSFET MP0 is coupled to the common node CN.

The gates of the MOSFETs MN0 and MP0 are coupled respectively to a control circuit 501 through a first optionally included low-pass filter, which may include the resistor Rn and/or the capacitor Cn and a second optionally included low-pass filter which may include the resistor Rp and/or the capacitor Cp. The first and second low-pass filters provide noise isolation for the gates of the MOSFETs MN0 and MP0 that may be generated in the control circuit, and, in addition, provide low impedance at high frequencies to the drain (or collector) of the respective transistor to attenuate externally generated noise that may be coupled to these gate circuits.

The control circuit 501 in FIG. 5 generates the gate voltages Vngate and Vpgate so as to set the quiescent voltage of the node DQ to a desired voltage between the source voltages Vdd and Vss. Preferably, the quiescent voltage is at about a midpoint between the magnitudes of the Vdd and Vss nodes. By way of example, the magnitude of the voltage at the Vdd node may be about 1.8 volts, while the magnitude at the Vss node may be about 0 volts. Thus, the quiescent voltage of the common node DQ is preferably about 0.9 volts. In addition, the control circuit sets the quiescent current through the drains of the MOSFETs MN0 and MP0. Preferably, the quiescent current through the MOSFETs MN0 and MP0 is set at a low level compared to the quiescent current that would flow if the termination circuit were designed with resistors selected to provide the desired termination impedance. Alternatively, the control circuit sets the impedance presented to the termination node DQ.

The control circuit 501 on FIG. 5 includes a MOSFET MP4 that is a width-scaled replica of the MOSFET MP0. Since the MOSFET MP4 is implemented on the same die as MP0, its operating characteristics such as gate threshold voltage can be selectively arranged to accurately match those of MP0. While keeping the current density per μm of width constant, the voltage characteristics of both transistors will closely match, with less current consumed through the drain of MP4. The widths of MOSFETs MN1 and MN0 are also scaled to the P-channel MOSFETs. The MOSFET MN1 is coupled in series with the MOSFET MP1 and necessarily conducts the same current. Operational amplifier OP2 is coupled to MOSFET MN1 in circuit arrangement similar to the coupling of OP1 to MP2, and its gate voltage is set just above the gate threshold voltage for this N-channel device, i.e., the device is properly enabled by means of its gate-to-source voltage to conduct a current scaled to the current I flowing through MOSFET MP4.

In addition, in a manner similar to the arrangement described for the P-channel MOSFETs, the gate of MOSFET MN0 is coupled to the gate of MOSFET MN1, and the voltage of the sources of MOSFETs MN1 and MN0 are also at the voltage Vref supplied to the operational amplifiers OP1 and OP2 when the incremental voltage ΔV shown on FIG. 5 at the non-inverting input to OP1 is zero. Thus when the incremental voltage ΔV supplied to the operational amplifier OP1 is zero, the control circuit 501 provides gate voltages to the gates of MOSFETs MP0 and MP1 so that their coupled sources under quiescent conditions at the common node DQ and at the termination node DQ are at the potential Vref, and their drains conduct a current scaled to the current I produced by the current source CS.

Operational amplifier OP2 may be optionally biased to operate from a source voltage Vboost_pos that is greater than the source potential Vdd so as to enable gate drive voltages to be produced at the output of OP2 that exceed the source voltage Vdd. This may be required when the active termination circuit operates from a low source voltage Vdd and the gate threshold voltage of the N-channel MOSFETs is high. Similarly, operational amplifier OP1 may be optionally biased to operate from a source voltage Vboost_neg that is lower than the source potential Vss so as to enable gate drive voltages to be produced at the output of OP1 that are more negative than the source voltage Vss. This may be required when the voltage on the gate of MP0 to achieve the desired transconductance is close to, or lower than, the voltage source VSS.

The control circuit 501 need not be coupled to just one active series circuit on the same die. If multiple active series circuits are fabricated on the same die, the added MOSFETs can be fabricated with characteristics substantially identical to those of MN0 and MP0, and will operate at substantially the same temperature, and can thus be controlled with the same gate control signals generated by a single control circuit 501.

Figure 6:
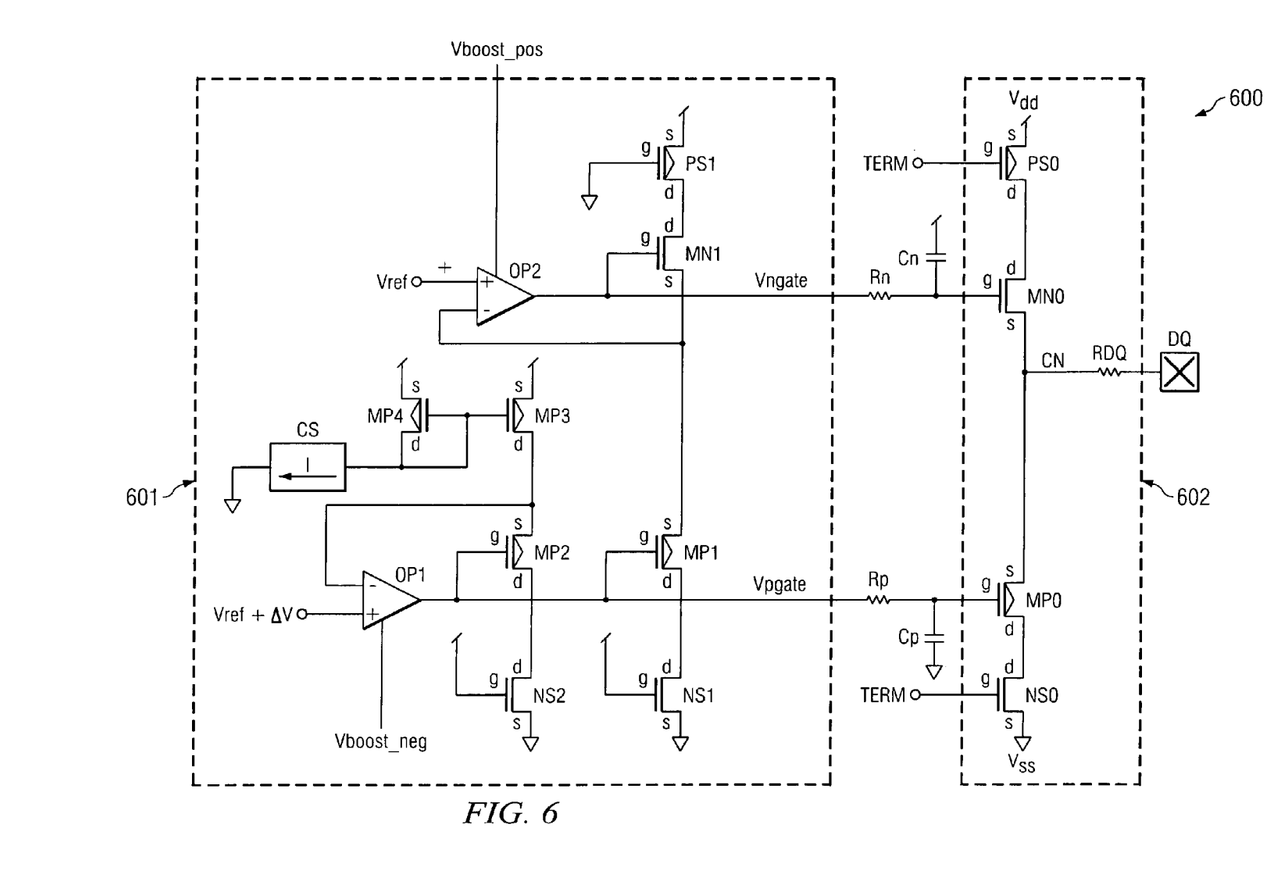
FIG. 6 is an alternative active termination circuit that provides flexibility to selectively enable or disable circuit operation.

Reference is now made to FIG. 6, which is a circuit diagram of an active termination circuit 600 in accordance with one or more further aspects of the present invention. For the purpose of brevity, a detailed description of the interconnections and operation of the circuit 600 that correspond to similar items on FIG. 5 will not be presented inasmuch as they are believed to be evident in light of the discussion hereinabove with respect to FIG. 5.

The circuit 600 includes a control circuit, 601, and an active series circuit 602. In the active termination circuit 600, five additional MOSFETs NS0, NS1, NS2, PS0, and PS1 provide the capability to selectively enable or disable the controlled impedance function of the active termination circuit 600 in response to an enable signal. Term and its logical complement Term-bar. The MOSFETs NS0 and PS0, when their gates are selectively turned off by the signal Term and Term-bar, prevent current flow through the MOSFETs MN0 and MP0, thereby disabling the operation of the active termination circuit 600.

However, coupling MOSFETs NS0 and PS0 in series with MOSFETs NS0 and PS0 adds a small voltage offset to the terminals of MOSFETs NS0 and PS0, thereby altering the precise gate control voltages needed for MOSFETs MN0 and MP0. The inclusion of MOSFETs NS1, NS2, and PS1 in control circuit 601 provides the necessary voltage offsets for the process of generating gate control voltages so that control circuit 601 can control MOSFETs MN0 and MP0 precisely. The areas of the added MOSFETs are scaled to the MOSFETs in their respective series circuit so that the proper voltage offsets are generated in view of the currents enabled by the current source CS.

Figure 7:
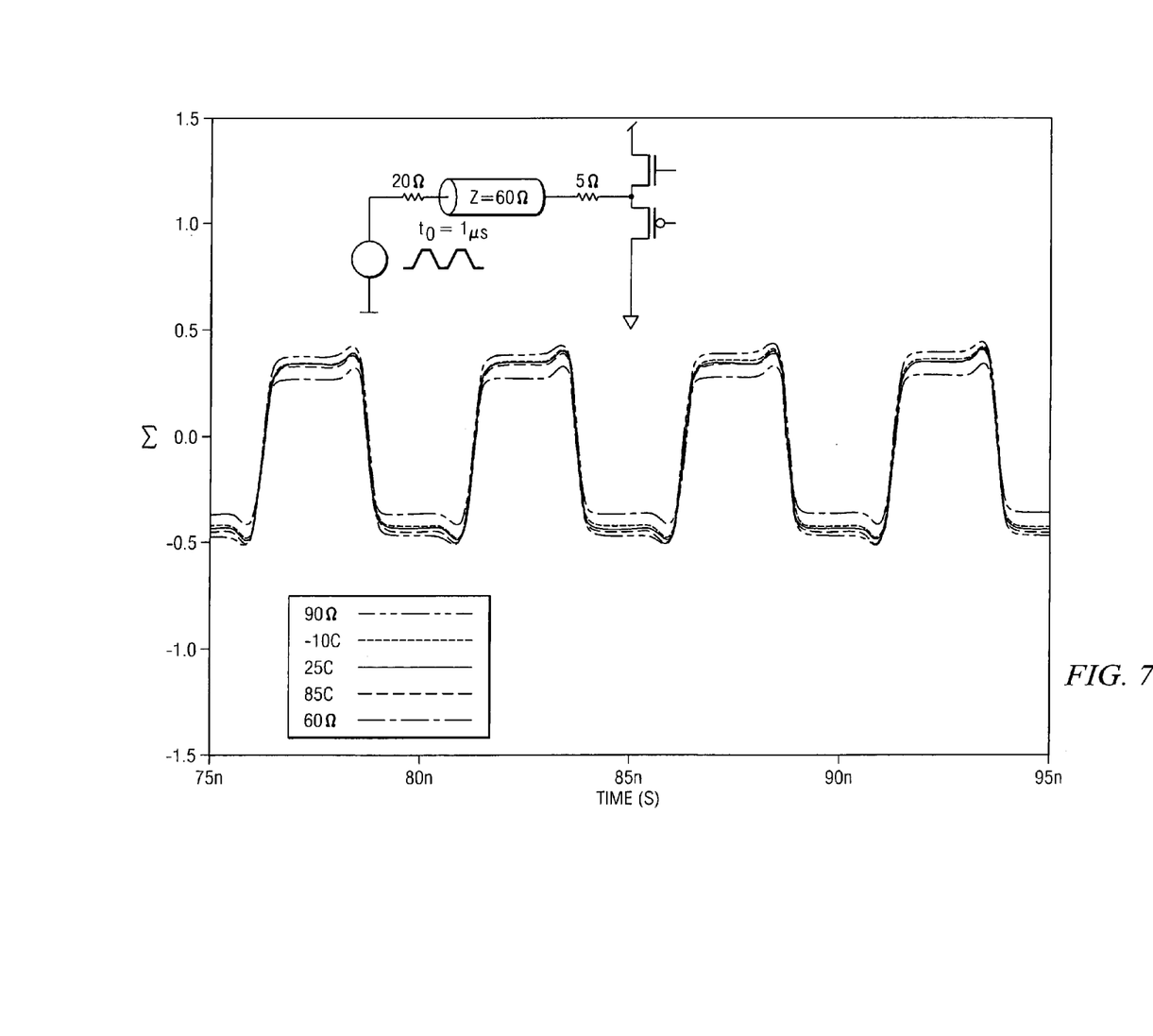
FIG. 7 is a graphical illustration of controlled impedance characteristics of an active termination circuit.

Reference is now made to FIG. 7, which is a graphical illustration of the controlled impedance characteristics of the active termination circuit 600 shown in FIG. 6. In particular, FIG. 7 plots impedance of the active termination circuit along the ordinate axis and the voltage applied to the DQ termination node minus Vdd/2 along the abscissa. The plotted curves show impedance for 45 runs of a device and circuit simulation of the active termination circuit, where individual plots reflect variations in the voltage source Vdd from 1.7 to 1.9 volts, die temperatures variations from −10° centigrade to 85° centigrade, and silicon processing variations of a representative die manufacturing process.

The results demonstrate that for impressed voltages at the DQ node of ±0.6 volts with respect to a quiescent termination voltage of Vdd/2, which was a requirement for a marketable class of devices, the controlled impedance of an active termination circuit intended for application to a 75 ohm transmission line remains in the range of 65 ohms to 85 ohms for all expected operational variations, which met a design intent.

Figure 8:
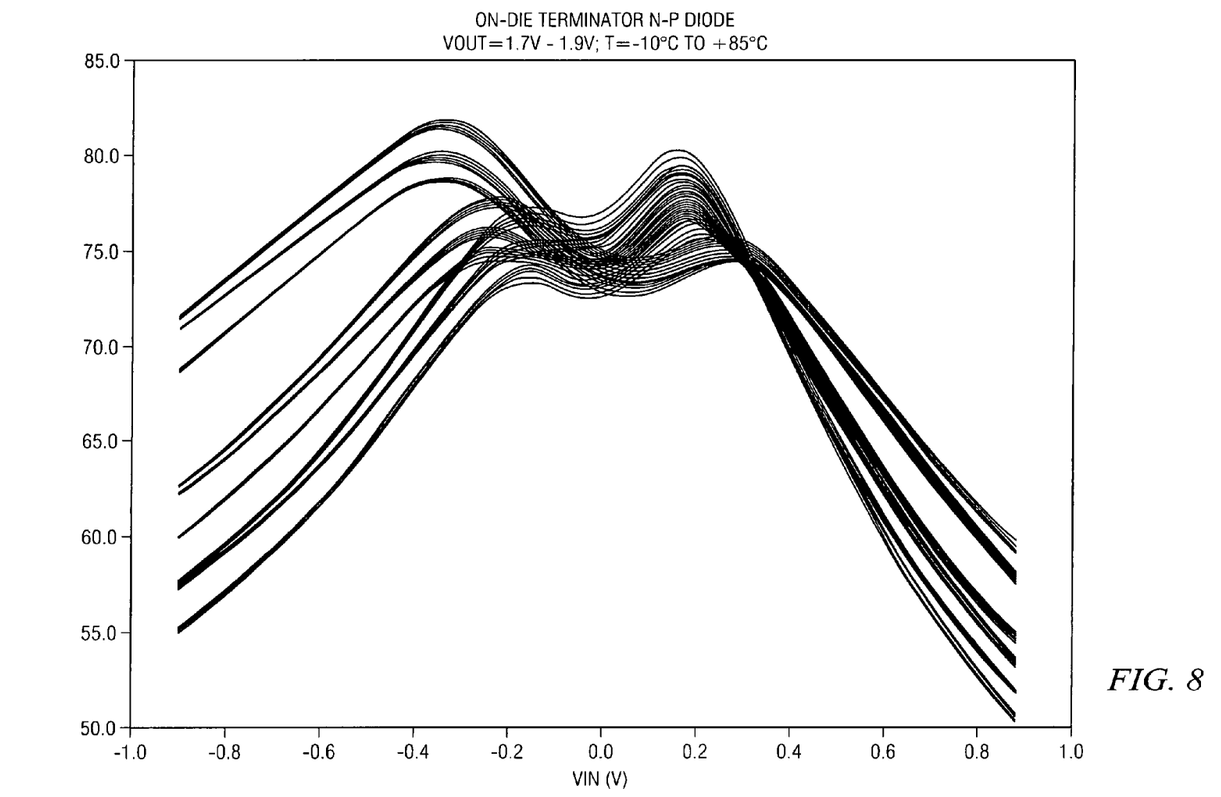
FIG. 8 is a graphical illustration of voltage versus time characteristics of an active termination circuit.

Reference is now made to FIG. 8, which is a graphical illustration of the voltage versus time characteristics of the active termination circuit 600 shown on FIG. 6. In particular, FIG. 8 plots voltage along the ordinate axis and time along the abscissa. The plotted waveforms correspond to voltages induced on the termination node DQ in FIG. 6 and the corresponding termination node DQ in FIG. 1. More particularly, the uppermost and lowermost curves on FIG. 8 represents voltage induced with a 90 ohm and 60 ohm resistor termination using the circuit in FIG. 1, whereas the three intermediate curves represent performance of the active termination circuit on FIG. 6 simulated with die temperatures of −10°, 25°, and 85° centigrade, and a resistor $R_{DQ}$ with a resistance of 5 ohms. In all cases the transmission line had a characteristic impedance of 60 ohms and a transmission delay of 1µ second. The transmission line was driven by a source with an internal resistance of 20 ohms.

Figure 9:
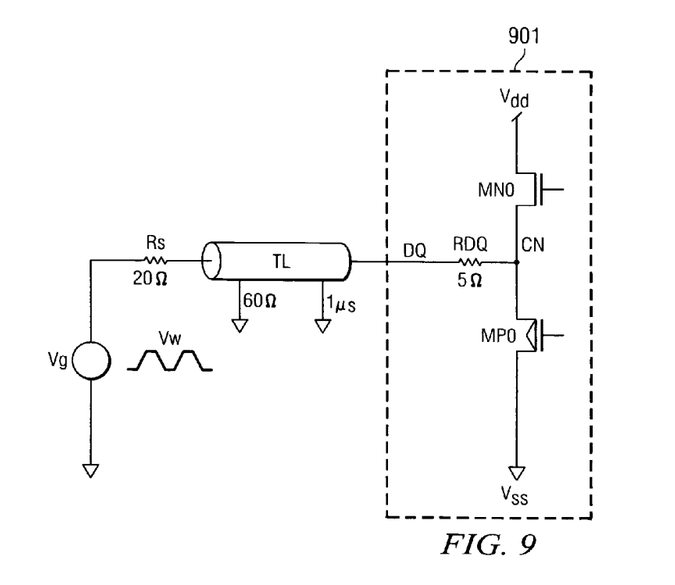
FIG. 9 shows the structure of a simulation arrangement used to generate the voltage versus time characteristics of the active termination circuit shown on FIG. 8.

FIG. 9 shows the structure of the simulation arrangement used to produce the results shown on FIG. 8. A portion of the active termination circuit 901 is shown operating between the voltage sources Vdd and Vss, including the optional resistor $R_{DQ}$ with resistance of 5 ohms. The active termination circuit, 901, is coupled to a transmission line TL, with 60 ohms characteristic impedance and 1µ second transmission delay. The transmission line, TL, is driven by a voltage waveform generator Vg, with source resistance Rs of 20 ohms. The voltage waveform generator Vg generated a trapezoidal voltage waveform similar to the waveform shape Vw with a frequency of 200 MHz.

Although the present invention has been described in detail and with reference to particular embodiments, those skilled in the art should understand that various changes, substitutions and alterations can be made as well as alterative embodiments of the invention without departing from the spirit and scope of the invention in its broadest form.

What is claimed is:

1. An integrated circuit comprising:
    an active termination circuit having first and second transistors of opposite type coupled in series between a Vdd node of a first source potential and a Vss node of a second source potential, the second source potential being lower than the first source potential, the active termination circuit including at least one termination node being coupled to a common node between the first and second transistors; and
    a control circuit operable to bias the first and second transistors, wherein the control circuit includes a first control terminal control circuit operable to provide a first control terminal drive signal to a control terminal of the first transistor, and a second control terminal control circuit operable to provide a second control terminal drive signal to a control terminal of the second transistor, and wherein the first and second control terminal drive signals are such that a quiescent voltage potential of the common node is between the first source potential and the second source potential; and wherein the first control terminal drive signal and the second control terminal drive signal are controlled such that a quiescent current conducted through the first and second transistors is substantially less than a current through two resistors whose parallel resistance approximates the characteristic impedance of a coupled transmission line.

2. The integrated circuit as in claim 1 wherein the control circuit is operable to bias the first and second transistors such that they provide a clamping function at the common node.

3. The integrated circuit of claim 1 wherein:
    the first transistor is a MOSFET of the N-channel type and the second transistor is a MOSFET of the P-channel type;
    the drain of the first MOSFET is coupled to the Vdd node, and the drain of the second MOSFET is coupled to the Vss node; and
    sources of both MOSFETs are coupled together and to the common node.

4. The integrated circuit of claim 1 wherein the quiescent voltage potential of the common node is at about a midpoint between the first and second source potentials.

5. The integrated circuit of claim 1 and further comprising:
    a third transistor having a current path and a control terminal, the current path coupled between the first transistor and the Vdd node; and
    a fourth transistor, having a current path and a control terminal, the current path coupled between the second transistor and the Vss node wherein the operation of the first and second transistors can be selectively enabled or disabled by control signals coupled to the control terminals of the third and fourth transistors.

6. The integrated circuit of claim 5 wherein the third transistor is a P-channel MOSFET and the fourth transistor is an N-channel MOSFET.

7. The integrated circuit of claim 1 wherein the control circuit includes a voltage source operable to produce a voltage potential of about a midpoint of the voltages of the first source potential and the second source potential.

8. The integrated circuit of claim 1 wherein the control circuit includes a voltage source operable to produce a voltage potential responsive to an externally supplied input voltage.

9. The integrated circuit of claim 1 and further comprising a resistor coupled between the common node and the termination node.

10. An integrated circuit of comprising:
    an active termination circuit having first and second transistors of opposite type coupled in series between a Vdd node of a first source potential and a Vss node of a second source potential, the second source potential being lower than the first source potential, the active termination circuit including at least one termination node being coupled to a common node between the first and second transistors;
    a control circuit operable to bias the first and second transistor, wherein the control terminal control circuit includes a fifth transistor and a sixth transistor coupled in series between the Vdd node and the Vss node and scaled to the first and second transistors; and
    a current source coupled to at least one of the fifth or sixth transistor, the current source controlling a quiescent current level in the first and second transistors.

11. The integrated circuit of claim 10 wherein the fifth transistor is an N-channel MOSFET, and the sixth transistor is a P-channel MOSFET.

12. An active termination circuit, comprising:
a first MOSFET having a gate terminal, a drain terminal, and a source terminal, the source terminal coupled to a common node, and the drain terminal coupled to a Vdd node of a first source potential, wherein the first MOSFET comprises an n-channel MOSFET;
a second MOSFET having a gate terminal, a drain terminal, and a source terminal, the source terminal coupled to the common node, and the drain terminal coupled to a Vss node of a second source potential, the second source potential being lower than the first source potential, wherein the second MOSFET comprises a p-channel MOSFET; and
a control circuit operable to bias the first and second MOSFETs;
wherein the gate terminal of the first MOSFET is coupled to a voltage source between the first and second source potentials and the gate terminal of the second MOSFET is coupled to another voltage source of a lower potential and wherein the potential difference between the voltage sources coupled to the gates of the first and second MOSFETs is controlled by a current source.

13. The active termination circuit of claim 12 wherein the control circuit operates to bias the first and second MOSFETs such that a controlled impedance is exhibited at the common node.

14. The active termination circuit of claim 12 wherein the control circuit comprises:
a first operational amplifier with an output coupled to the gate terminal of the first MOSFET; and
a second operation amplifier with an output coupled to the gate terminal of the second MOSFET.

15. The active termination circuit of claim 12 and further comprising a first enable switch coupled between the first MOSFET and the Vdd node and a second enable switch coupled between the second MOSFET and the Vss node.

16. An active termination circuit:
a first MOSFET having a gate terminal, a drain terminal, and a source terminal, the source terminal coupled to a common node, and the drain terminal coupled to a Vdd node of a first source potential, wherein the first MOSFET is an N-channel MOSFET;
a second MOSFET having a gate terminal, a drain terminal, and a source terminal, the source terminal coupled to the common node, and the drain terminal coupled to a Vss node of a second source potential, the second source potential being lower than the first source potential, wherein the second MOSFET is a P-channel MOSFET; and
a control circuit operable to bias the first and second MOSFETs wherein the control circuit comprises a first operational amplifier with an output coupled to the gate terminal of the first MOSFET and a second operation amplifier with an output coupled to the gate terminal of the second MOSFET;
wherein the first operational amplifier is powered by a power supply potential greater than the first source potential and the second operational amplifier is powered by a power supply potential less than the second source potential; the first and second operational amplifiers capable of producing gate drive signals greater than the first source potential and less than the second source potential, respectively.

17. The active termination circuit of claim 16 and further comprising:
a third MOSFET with a channel coupled between the Vdd node and the first operational amplifier, the third MOSFET having a gate terminal coupled to the gate terminal of the first MOSFET, the third MOSFET being an N-channel MOSFET; and
a fourth MOSFET with a channel coupled between the Vss node and the second operational amplifier, the fourth MOSFET having a gate terminal coupled to the gate terminal of the second MOSFET, the fourth MOSFET being a P-channel MOSFET.

18. A method of operating an active termination circuit, the method comprising:
biasing first and second series coupled transistors of opposite type such that they exhibit a controlled impedance at a common node thereof, wherein the first and second transistors are coupled in series between a Vdd node of a first source potential and a Vss node of a second soiree potential, the common node being between the first and second transistors, and the second source potential being lower than the first source potential;
wherein device geometries, device size, and processing of the first and second transistors are scaled so that a controlled impedance and a quiescent voltage potential are generated at the common node in response to induced voltages produced by a driver circuit that couples communication signals to the common node.

19. The method of claim 18 wherein biasing first and second series coupled transistors comprises producing first and second control terminal drive signals and applying said first and second control terminal drive signal to the first and second series coupled transistors, the first and second control terminal drive signals produced such that the quiescent voltage potential of the common node is between the first source and second source potentials.

20. The method of claim 19 wherein the first and second series coupled transistors are MOSFETs.

21. The method of claim 18 wherein the quiescent voltage potential of the common node is produced at about a midpoint between the first source potential and second source potential.

22. An integrated circuit comprising:
an active termination circuit having first and second transistors of opposite type coupled in series between a Vdd node of a first source potential and a Vss node of a second source potential, the second source potential being lower than the first source potential, the active termination circuit including at least one termination node that is coupled to a common node between the first and second transistors; and
a control circuit operable to bias the first and second transistors, wherein the control circuit includes a first control terminal control circuit operable to provide a first control terminal drive signal to a control terminal of the first transistor, and a second control terminal control circuit operable to provide a second control terminal drive signal to a control terminal of the second transistor, wherein the first and second control terminal drive signals are such that a quiescent voltage potential of the common node is between the Vdd and Vss potentials; and
wherein device geometries, device size, and processing of the first and second transistors are scaled so that they achieve a controlled impedance and the quiescent voltage potential at the common node in response to an induced voltages produced by a driver circuit that couples communication signals to the termination node, and wherein the quiescent voltage potential is at about a midpoint between the first source potential and the second source potential.

23. An integrated circuit comprising:

an active termination circuit having first and second transistors of opposite type coupled in series between a Vdd node of a first source potential and a Vss node of a second source potential, the second source potential being lower than the first source potential, the active termination circuit including at least one termination node that is coupled to a common node between the first and second transistors; and a control circuit operable to bias the first and second transistors, wherein the control circuit includes a first control terminal control circuit operable to provide a first control terminal drive signal to a control terminal of the first transistor, and a second control terminal control circuit operable to provide a second control terminal drive signal to a control terminal of the second transistor, wherein the first and second control terminal drive signals are such that a quiescent voltage potential of the common node is between the Vdd and Vss potentials; and wherein the first and second control terminal control circuits are operable from voltage sources that are greater than the first source potential for the first control terminal control circuit, and less than the second source potential for the second control terminal control circuit, and are capable of providing control terminal control signals, respectively, that are greater than the first source potential and less than the second source potential.

24. The integrated circuit of claim 23 wherein the first and second control terminal control circuits are operable to provide the first control terminal drive signal to the control terminal of the first transistor and the second control terminal drive signal to the control terminal of the second transistor to control the quiescent current through the first and second transistors.

* * * * *

UNITED STATES PATENT AND TRADEMARK OFFICE
CERTIFICATE OF CORRECTION

PATENT NO.    : 7,019,554 B2
DATED         : March 28, 2006
INVENTOR(S)   : Kiehl et al.

It is certified that error appears in the above-identified patent and that said Letters Patent is hereby corrected as shown below:

Column 14,
Line 16, delete "soiree" and insert -- source --.
Line 29, delete "signal" and insert -- signals --.

Signed and Sealed this

Thirtieth Day of May, 2006

JON W. DUDAS
*Director of the United States Patent and Trademark Office*